United States Patent [19]

Belmares-Sarabia et al.

[11] Patent Number: 4,823,184

[45] Date of Patent: * Apr. 18, 1989

[54] COLOR CORRECTION SYSTEM AND METHOD WITH SCENE-CHANGE DETECTION

[75] Inventors: Armand Belmares-Sarabia, Catskill, N.Y.; Stanley J. Chayka, Parsippany, N.J.

[73] Assignee: Corporate Communications Consultants, Inc., Fairfield, N.J.

[*] Notice: The portion of the term of this patent subsequent to Sep. 15, 2004 has been disclaimed.

[21] Appl. No.: 94,241

[22] Filed: Sep. 8, 1987

Related U.S. Application Data

[63] Continuation-in-part of Ser. No. 722,801, Apr. 12, 1985, Pat. No. 4,694,329, which is a continuation-in-part of Ser. No. 598,468, Apr. 9, 1984, Pat. No. 4,679,067.

[51] Int. Cl.[4] .................................................. H04N 7/18
[52] U.S. Cl. ................................... 358/27; 358/21 R; 358/105
[58] Field of Search ................. 358/27, 21 R, 31, 105, 358/136

[56] References Cited

U.S. PATENT DOCUMENTS

| | | | |
|---|---|---|---|
| 3,603,729 | 9/1971 | Sperber | 358/105 |
| 3,816,648 | 6/1974 | Noll et al. | 358/105 |
| 3,825,676 | 7/1974 | Ramsden | 358/105 |
| 3,828,125 | 8/1974 | Fagan et al. | 358/105 |
| 4,458,266 | 7/1984 | Mahoney | 358/105 |
| 4,626,891 | 12/1986 | Achiha | 358/21 R |

FOREIGN PATENT DOCUMENTS

| | | | |
|---|---|---|---|
| 129892 | 8/1983 | Japan | 358/31 |
| 2079091 | 1/1982 | United Kingdom | 358/31 |

OTHER PUBLICATIONS

Pearson et al., A Simple Motion Detector for Television Signals, Journal of the SMPTE, vol. 82, pp. 17–22, Jan. 1973.

Kitson et al., Preprogrammed and Automatic Color Correction for Telecine Journal of the SMPTE, vol. 83, pp. 633–639, Aug. 1974.

*Primary Examiner*—John W. Shepperd
*Attorney, Agent, or Firm*—Curtis, Morris & Safford

[57] ABSTRACT

A color correction system with an improved scene-change detection module is disclosed. The scene-change detection module processes video picture signals representative of images stored by an image recording medium to detect the start of a new scene. The module advantageously includes circuits which sense a change in each of at least two different parameters of the video picture signals. The changes are analyzed in relation to a preselected condition. The module also includes circuits which generate a change detect signal when the change in at least one of the two parameters satisfies the preselected condition. Preferably, an area discrimination circuit is employed to limit the portion of the video picture in which the signals are sampled for scene-change detection purposes. One of the parameters that may be analyzed is a signal indicative of the color content of the video picture. Another parameter that may be analyzed corresponds to signals in a particular frequency range, which frequency range is below the range of frequencies for chrominance signals. As an alternative, the scene-change detection module may analyze just signals in a preselected frequency range when trying to find the start of a new scene. Each parameter may be analyzed by determining its average level in at least a portion of one video field, determining its average level in at least a portion of another video field, and then comparing the difference in average levels with a predetermined standard.

20 Claims, 4 Drawing Sheets

COLOR CORRECTION SYSTEM AND METHOD WITH SCENE-CHANGE DETECTION

CROSS-REFERENCE TO RELATED APPLICATIONS

This application is a continuation-in-part application based upon application Ser. No. 722,801, entitled "Color Correction System and Method With Scene-Change Detection," which was filed on Apr. 12, 1985, and which has issued as U.S. Pat. No. 4,694,329 on Sept. 15, 1987. Application Ser. No. 722,801 was a continuation-in-part application based upon application Ser. No. 598,468, entitled "Color Correction System and Method With Localized Color Sampling," which was filed on Apr. 9, 1984, and which has issued as U.S. Pat. No. 4,679,067 on July 7, 1987. The disclosures in U.S. Pat. No. 4,694,329 and U.S. Pat. No. 4,679,067 are hereby incorporated herein by reference.

BACKGROUND OF THE INVENTION

The invention generally relates to systems and methods for color correcting video picture signals and for detecting scene changes during color correction operations. More particularly, the invention pertains to improved systems and methods for increasing the quality and speed of color correction operations by enhancing the ability of color correction equipment to determine when a new scene begins. This patent application describes improvements upon the color correction systems and methods disclosed in U.S. Pat. No. 4,096,523 (the "Rainbow" patent); No. 4,223,343 (the "Anamorphic" patent); No. 4,410,908 (the "Luminance" patent); No. 4,679,067; and No. 4,694,329; as well as those disclosed in copending, commonly owned U.S. Pat. Appl. Ser. No. 807,815, entitled "Editing System and Method"; Ser. No. 851,164, entitled "Color Correction System and Method"; Ser. No. 942,901, entitled "Color Correction System and Method"; Ser. No. 943,218, entitled "Color Correction System and Method"; and Ser. No. 943,298, entitled "Color Correction System and Method." The disclosures of these patents and patent applications are hereby incorporated herein by reference.

There is a continuing need to improve the efficiency, speed, and quality of the color correction of video picture signals, especially in film-to-tape and tape-to-tape transfers, and particularly in scene-by-scene color correction. For instance, there is a need for equipment that more accurately senses new scenes in a motion picture film or a videotape that is being color corrected. Furthermore, there is a need to prevent the physical degradation of motion picture film and videotape caused by scratching due to the back-and-forth movement necessary to find the beginning of a scene. Moreover, there is a need to reduce the time an operator spends hunting for the start of a scene.

An accurate scene-change detector is especially important when a videotape is being color corrected, since the image may change at the video field rate of 60 hertz. By contrast, when a motion picture film is being color corrected, the image may change at the frame rate of 24 hertz. Hence, finding the start of a new scene on a videotape may be very difficult and time-consuming to accomplish manually inasmuch as more images appear during a given period than with a film.

A scene-change detector or analyzer is advantageously used with a color corrector, as indicated in an article entitled "The Pre-Programming of Film-Scanner Controls," by D. J. M. Kitson, A. B. Palmer, R. H. Spencer, J. R. Sanders, and M. Weston, which was published in *E.B.U. Review*, No. 134, August 1972, on pages 156–162, and an article entitled "Preprogrammed and Automatic Color Correction for Telecine," by D. J. M. Kitson, J. R. Sanders, R. H. Spencer, and D. T. Wright, which was published in the *Journal of the SMPTE*, Volume 83, August 1974, on pages 633–639. There is a need for improvement of scene-change detectors or analyzers.

OBJECTS OF THE INVENTION

Accordingly, an object of the invention is to satisfy the above needs and provide a system and method for color correcting video picture signals with increased efficiency, speed, and quality.

Another object of the invention is to provide a system and a method for improving the accuracy with which the start of a new scene may be ascertained.

An additional object of the invention is to provide a signal processing device and a method for reducing the number of new scenes missed by a scene-change detector.

A further object of the invention is to provide a system and a method for preventing the physical degradation, e.g., scratching, of motion picture film and videotape caused by jogging the recording medium back and forth when hunting for the start of a new scene.

Yet another object of the invention is to provide an apparatus with improved signal processing circuits and a method with improved signal processing techniques.

Still another object of the invention is to provide improved devices and techniques for analyzing various video signal parameters in order to ascertain when a new scene begins.

Another object of the invention is to provide a scene-change detector and corresponding signal processing method that accurately analyze even low-level video signals to sense the start of a new scene.

SUMMARY OF THE INVENTION

The invention satisfies the needs identified above and meets the foregoing objects by providing a system which is better able to sense scene changes in a succession of video picture signals. In accordance with one aspect of the invention, a color corrector includes a scene change detection module which processes video picture signals to detect when the corresponding images start a new scene. Specifically, the scene change detection module includes circuits for analyzing a change in each of at least two different parameters of the video picture signals. Each change is independently compared with a predetermined standard, and the scene change detection module generates a change detect signal when the change in at least one of the two parameters satisfies the predetermined standard. Preferably, an area discrimination circuit is provided for the scene change detection module. Such an area discrimination circuit may permit the operator to selectively control the portion of the video picture in which the video picture signals are analyzed.

The scene change detection module advantageously analyzes a video signal parameter that is indicative of the color content of the picture as well as a video signal parameter that corresponds to signals in a preselected frequency range. The preselected frequency range is preferably below the range of frequencies for chrominance signals, and may be between about 1.5 megahertz and about 2.5 megahertz.

In accordance with another aspect of the invention, a scene change analyzer includes a bandpass filter which transmits video signals within a preselected pass band. The scene change analyzer also includes scene sensing circuits which are responsive to the video signals transmitted by the bandpass filter. Such scene sensing circuits may be provided with individual circuits or a programmable device for determining a first average level of the transmitted video signals in at least a portion of a first video field and for determining a second average level of the transmitted video signals in at least a portion of a second video field. The difference between the average levels is then compared with a predetermined standard in order to test whether a new scene has started. If the predetermined standard is satisfied, the scene change analyzer produces an output signal indicative of a scene change. Preferably, the pass band of the bandpass filter is centered at approximately 2.0 megahertz and has a width of about 1.0 megahertz around the center frequency.

The features of the invention each improve the ability of the equipment to detect the start of a new scene and increase the efficiency of the color correction process. Such features enable an operator to color correct a motion picture film or a videotape more efficiently, thereby reducing the cost of the color correction procedure.

BRIEF DESCRIPTION OF THE DRAWINGS

The above and other objects, features, and advantages of the present invention will become apparent upon consideration of the following detailed description of illustrative embodiments thereof, especially when taken in conjunction with the accompanying drawings, wherein.

DETAILED DESCRIPTION OF THE PREFERRED EMBODIMENTS

General Description

Figure 1:
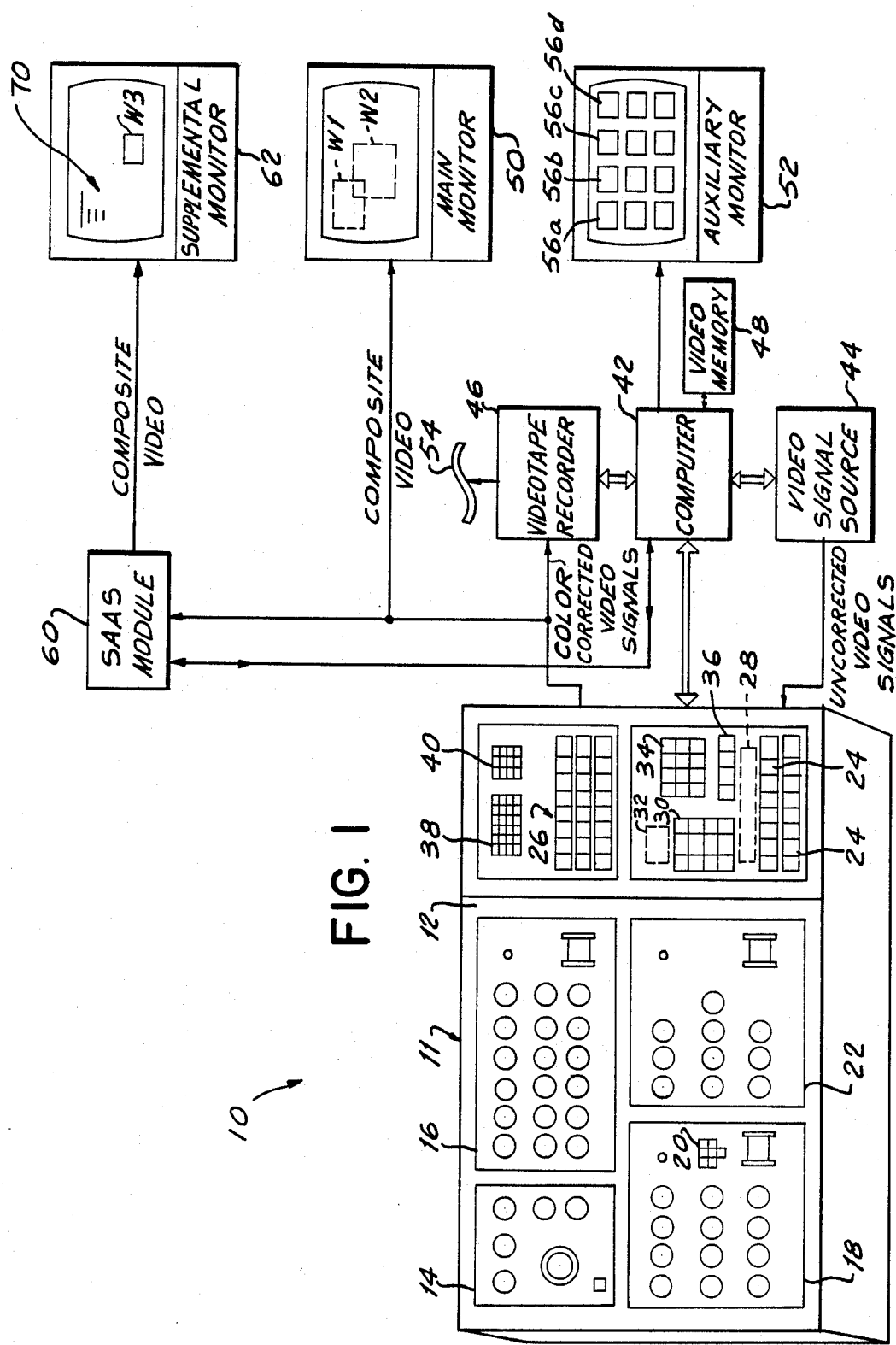
FIG. 1 is a diagrammatic illustration of a color correction system with a scene acquisition and sensing module according to the invention.

FIG. 1 shows a color correction system 10 which includes a color corrector 11 having a front panel 12. Portions of the front panel 12 are illustrated in greater detail in FIGS. 2-4 of application Ser. No. 851,164; application Ser. No. 942,901; application Ser. No. 943,218; and application Ser. No. 943,298. The front panel 12 has a set of variable vector controls 14 and a set of six vector controls 16. The six vector controls 16 function as outlined in the Rainbow and Luminance patents, which are mentioned above.

Referring now to the lower left-hand portion of FIG. 1, the front panel 12 includes a set of color balance controls 18 and "window" controls 20. The "window" controls 20 are described and depicted in greater detail in U.S. Pat. No. 4,679,067 as well as in U.S. Pat. No. 4,694,329. The front panel 12 additionally includes video signal source controls 22. A telecine or a videotape recorder/reproducer may be employed as the video signal source. The video signal source controls 22 may adjust parameters such as the PEC gain and negative gain for each of the red, green, and blue channels. Moreover, the video signal source controls may adjust other parameters, for instance, the horizontal pan, the vertical pan, the zoom, and the contours. Each of the controls in the sets of controls 14, 16, 18, and 22 includes a control knob which is coupled to a shaft-position encoder, as discussed in U.S. Pat. No. 4,679,067 and U.S. Pat. No. 4,694,329.

The right side of the front panel 12 includes pushbuttons and displays. Specifically, this portion of the front panel includes two rows of pushbuttons 24, which are shown in greater detail in FIG. 4 of the above-identified patent applications, and three rows of pushbuttons 26, which are shown in greater detail in FIG. 3 of the above-identified patent applications. The functions of many of these pushbuttons are explained in the Rainbow and Luminance patents. A display 28 shows the scene number for the color corrections stored in the A buffer and the B buffer. Moreover, the display 28 shows the scene number for the current scene.

Still referring to FIG. 1, a keypad 30 and a display 32 are used to recall the color corrections for a particular scene and apply them to the present scene. For example, if the operator wanted to use the color corrections for previous scene number 1,234 and apply them to the current scene, the operator would press the "call" pushbutton in the upper one of the rows 24 and then the buttons 1, 2, 3, and 4 of the keypad 30 in this sequence in order to recall the desired color corrections.

Also shown in FIG. 1 is an array 34 of pushbuttons and a row of pushbuttons 36 for use in the "Call-A-Picture" feature of the color correction system. The operation of the "Call-A-Picture" feature is described in application Ser. No. 943,298. The upper right portion of the front panel 12 depicted in FIG. 1 has waveform pushbuttons and indicators 38 for selecting various waveforms for viewing on an oscilloscope (not shown) as well as monitor selector pushbuttons and indicators 40 for selecting various signals for monitoring.

As illustrated in FIG. 1, the system 10 has a computer 42, which is connected to each of the color corrector 11, a video signal source 44, a videotape recorder 46, and a video memory 48. The video signal source 44 may be a film chain or telecine, a videotape player, or the like. The video signal source 44 produces video signals from the associated image recording medium. These video signals are delivered to the color corrector 11 so that they can be corrected. The color corrector 11 provides color corrections for the video signals from the video signal source 44 under the direction of the operator and the computer 42, and it produces color corrected video signals. The color corrected video signals are sent to a main monitor 50, and, at the appropriate time, to the videotape recorder 46. The operator may observe the effect of the color corrections on the video signals by looking at the video picture on the main monitor 50. The videotape recorder 46 records the color corrected video signals on a videotape 54, usually during a second run after color corrections have been made during a first run, thereby producing a color corrected videotape.

The main monitor 50 is shown with windows W1 and W2. One use of the windows W1 and W2, which are movable in size and/or position, is described in the above-identified patent applications. Other uses of the windows are discussed in U.S. Pat. No. 4,679,067 and U.S. Pat. No. 4,694,329.

An auxiliary monitor 52 is connected to the computer 42. The auxiliary monitor 52 displays a plurality of video pictures, such as the video pictures 56a–56d. The auxiliary monitor 52 and the video memory 48 are employed to implement the "Call-A-Picture" feature of the color correction system.

Figure 2:
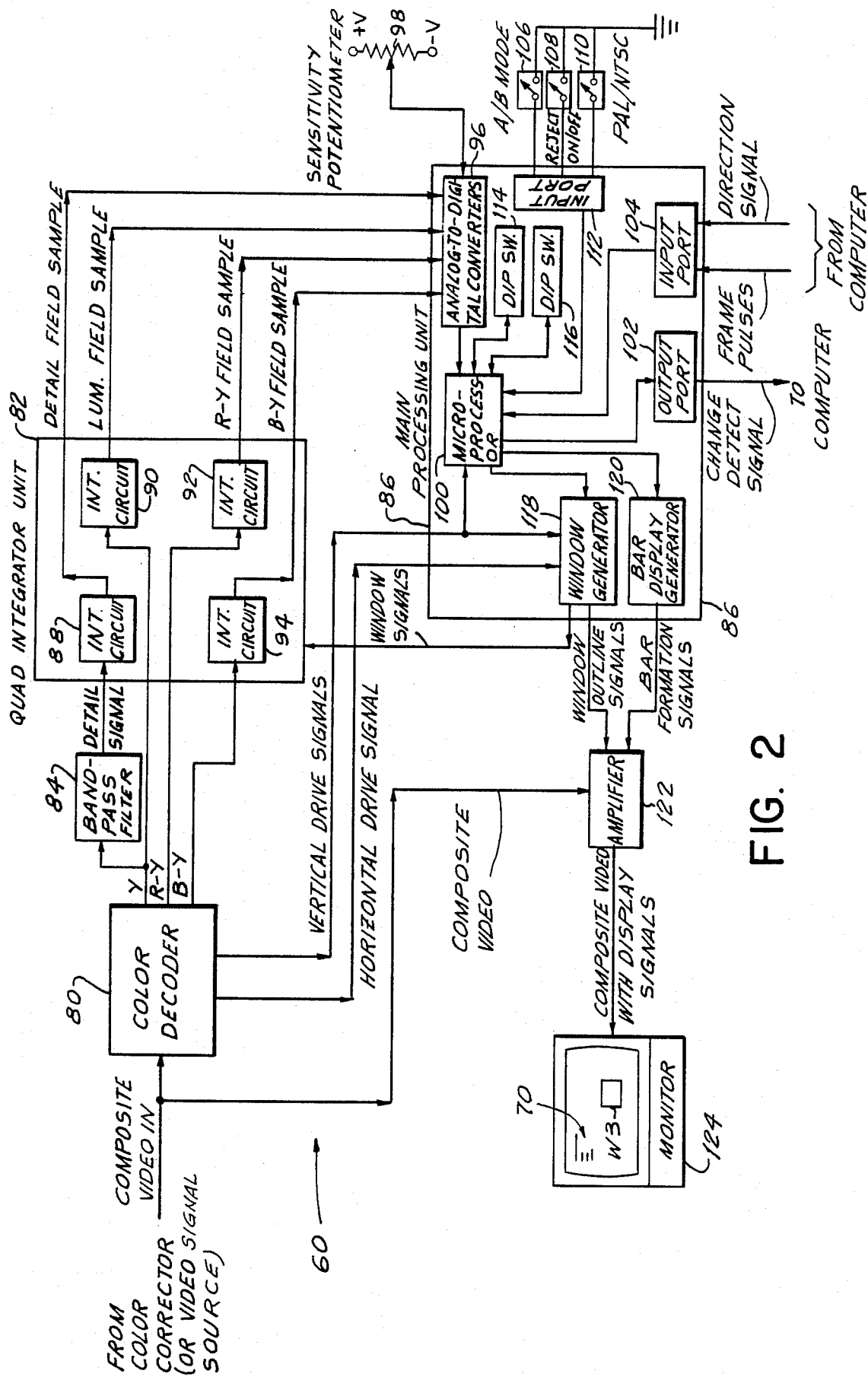
FIG. 2 is a block diagram of a scene acquisition and sensing module according to the invention.

FIG. 1 shows a scene acquisition and sensing module 60 according to the invention, which module is illustrated in greater detail in FIG. 2. The module 60 is connected to receive output signals from the color corrector 11. Namely, the color corrector 11 supplies color corrected video signals to the module 60. The module 60 processes these video signals to detect the start of a new scene, as explained below. The module 60 delivers output signals to a supplemental monitor 62.

The supplemental monitor 62 displays video pictures formed by the output signals from the color corrector 11. The supplemental monitor 62 also provides the operator with a bar graph display 70, which is discussed below in connection with FIGS. 3A and 3B, and it shows a window W3. The window W3 is generated by the module 60 under the control of the operator, and the window W3 is independent of the windows W1 and W2, which are displayed on the main monitor 50. The window W3 denotes the portion of the video picture in which the module 60 analyzes video signals to detect the beginning of a new scene. The operator may adjust the size and/or position of the window W3 as desired.

The module 60 is connected to send signals to and receive signals from the computer 42. The module 60 receives frame pulse and direction signals from the computer 42. The reason that these signals are delivered to the module 60 is explained below as part of the discussion of the flowchart of FIG. 4. The module 60 transmits a change detect signal to the computer 42 when it locates the start of a new scene, and the computer 42 then sends an appropriate signal to the color corrector 11.

FIG. 1 depicts the module 60 connected to the supplemental monitor 62, which may be a black-and-white monitor in order to reduce the cost of the system. However, the module 60 may be connected to the main monitor 50. If so, the module 60 is preferably connected through a switching circuit that will enable the operator to selectively control the presence of the bar graph display 70 and the window W3 on the main monitor 50. At times, the bar graph display 70 and the window W3 may be distracting to the operator when the operator is attempting to color correct the video pictures appearing on the main monitor 50. Accordingly, the presence of the bar graph display 70 and the window W3 on the main monitor 50 is advantageously controllable by the operator with a suitable switching circuit.

FIG. 1 shows the module 60 connected at the output of the color corrector 11. The module 60 may alternatively be connected at another point in the system. For instance, the module 60 may be located to receive uncorrected video signals from the video signal source 44.

Either composite video signals or component video signals may be delivered to the module 60. For ease of explanation, a module that processes composite video signals will be described below. However, a person having ordinary skill in the art will readily recognize how such a module may be modified to process component video signals.

Scene Acquisition and Sensing Module

FIG. 2 better illustrates a scene acquisition and sensing module 60 according to the invention. As shown in the upper left-hand portion of FIG. 2, composite video signals are delivered to a conventional color decoder 80. The color decoder 80 forms a luminance signal ("Y"), a signal representing the difference between the red and luminance signals ("R-Y"), and a signal representing the difference between the blue and luminance signals ("B-Y") from the input composite video signals. The color decoder 80 also derives horizontal drive signals and vertical drive signals from the composite video signals.

The color decoder 80 sends the Y, R-Y, and B-Y signals to a quad integrator unit 82. The color decoder 80 also sends the Y signal to a bandpass filter 84, which transmits its output signal to the quad integrator unit 82. A main processing unit 86 receives the horizontal drive signals and the vertical drive signals from the color decoder 80.

Preferably, the bandpass filter 84 has a center frequency of approximately 2.0 megahertz and a pass band of about ±0.5 megahertz around the center frequency. This range of frequencies corresponds to signals indicative of the sharpness or detail of images in a video picture. Accordingly, the output signals from the bandpass filter 84 are referred to as the detail signals in the following description. These detail signals may be advantageously employed to sense the start of a new scene, either alone or in combination with color-indicative signals, e.g., R-Y and B-Y signals, and/or the luminance signal, as explained further below.

The quad integrator unit 82 operates to sample the detail, Y, R-Y, and B-Y video signals in each field. The quad integrator unit 82 then supplies the sampled signals to the main processing unit 86, which analyzes the sampled signals from successive fields to determine whether a new scene has started. In order to accomplish its signal sampling function, the quad integrator unit 82 includes four integrator circuits 88, 90, 92, and 94. Each of these integrator circuits receives a different video signal at its input. Specifically, the output signals from the bandpass filter 84, i.e., the detail signals, are supplied to the integrator circuit 88, while the Y, R-Y, and B-Y signals are sent to the integrator circuits 90, 92, and 94, respectively. Thus, each integrator circuit independently samples the associated video signals.

Each of the integrator circuits 88, 90, 92, and 94 may comprise the integrator 304, the switching circuits 312 and 314, the integrator 316, and the buffer amplifier 318 which are shown in FIG. 9 of U.S. Pat. No. 4,694,329. Such integrator circuits determine the average level of the associated video signal in the sampled picture area on a field-by-field basis.

The main processing unit 86 delivers window signals to the quad integrator unit 82. The window signals are used to select the portion of the video picture in which the integrator circuits 88, 90, 92, and 94 are operative. In other words, the window signals from the main processing unit 86 control the integrator circuits so that they only sample video signals in a limited area of the video picture. This type of signal sampling for purposes of scene change detection is described in U.S. Pat. No. 4,694,329. As discussed in that patent, the size and the location of the area may be selectively controlled by the operator, who adjusts the area to obtain optimal performance.

For each field, the quad integrator unit 82 supplies four samples to the main processing unit 86. In particular, these are samples of the detail, Y, R-Y, and B-Y signals, and they are sent to a bank of analog-to-digital converters 96 in the main processing unit 86. The bank 96 includes an analog-to-digital converter for each of the four field samples. The bank 96 also includes an analog-to-digital converter which receives a signal from a sensitivity potentiometer 98.

The sensitivity potentiometer 98 is used to adjust the sensitivity, or threshold level, of the scene acquisition and sensing module 60. The output signal of the sensitivity potentiometer 98 corresponds to the threshold level signal shown in FIG. 9 of U.S. Pat. No. 4,694,329. A relatively high output signal from the potentiometer 98 results in a relatively high threshold level, and a relatively large change in the sampled signals is needed before a change detect signal is generated. Conversely, a comparatively low output signal from the potentiometer 98 results in a comparatively low threshold level, and a comparatively small change in the sampled signals will produce a change detect signal.

The module 60 independently analyzes each of the detail, Y, R-Y, and B-Y signals to detect the start of a new scene. That is, a change detect signal is generated when any one of these video parameters changes sufficiently so that the change exceeds the threshold level. Since four different parameters are being processed simultaneously and since a sufficient change in any one of these parameters may produce a change detect signal, the module 60 detects new scenes with greater accuracy than conventional devices. Fewer scene changes are missed.

Although a single sensitivity potentiometer is shown, a sensitivity potentiometer for each of the sampled video parameters may be provided. With this alternative arrangement, the threshold level for each of the sampled video parameters may be adjusted independently of the others.

The threshold level may be adjusted by a knob (not shown) on the front of the module 60, which knob is connected to the sensitivity potentiometer 98. In addition, the threshold level may be set and reset with the controls of the color corrector 11. For example, the "window" controls 20 may be operated to set or reset the threshold level by pressing the "size" pushbutton and holding it down and then by pressing the "arrow up" pushbutton or the "arrow down" pushbutton. The "arrow up" pushbutton is actuated to increase the threshold level, while the "arrow down" pushbutton is actuated to decrease the threshold level. These pushbuttons are shown in FIG. 1 of U.S. Pat. No. 4,679,067 and U.S. Pat. No. 4,694,329.

The analog-to-digital converters in the bank 96 supply digital representations of the field samples from the quad integrator unit 82 to the microprocessor 100. Furthermore, one of the analog-to-digital converters in the bank 96 delivers a digital representation of the threshold level from the sensitivity potentiometer 98 to the microprocessor 100. As explained in connection with the flowchart shown in FIG. 4, the microprocessor 100 analyzes the samples from various fields for each of the detail, Y, R-Y, and B-Y channels in order to detect the start of scene. When a scene change is sensed in any of the channels, the microprocessor 100 supplies a change detect signal to the computer 42 (FIG. 1) through an output port 102.

To accomplish its scene sensing function, the microprocessor 100 receives vertical drive signals from the color decoder 80 and frame pulse and direction signals from the computer 42 (FIG. 1). The signals from the computer 42 are delivered to the microprocessor 100 through an input port 104.

In addition, the microprocessor 100 receives input signals from the toggle switches 106, 108, and 110 through an input port 112 along with signals from the DIP (dual in-line pin) switches 114 and 116. The toggle switches 106, 108, and 110 together with the DIP switches 114 and 116 are used to configure the equipment to the particular needs or desires of the user. For instance, the individual switches constituting each of the DIP switches 114 and 116 may be set to establish whether the equipment operates with or without a certain feature. The individual switches forming a DIP switch may control such options as whether the equipment is used to detect scene changes for motion picture film or videotape, whether a linear lookup table or a logarithmic lookup table is employed for the field samples (see the discussion of the flowchart of FIG. 4), and whether all or only some of the four channels are analyzed by the microprocessor 100.

The "A/B mode" toggle switch 106 determines whether the microprocessor reads the individual switches in DIP switch 114 or the individual switches in DIP switch 116. In other words, one of the DIP switches 114 and 116 contains the presets for the A mode of the equipment, while the other of the DIP switches 114 and 116 contains the presets for the B mode of the equipment. The function of the "reject on/off" toggle switch 108 will be discussed below in connection with the description of the flowchart of FIG. 4. Briefly, however, this switch determines whether a single greater-than-threshold-level difference or whether consecutive greater-than-threshold-level differences are necessary to produce a change detect signal. The "PAL/NTSC" toggle switch 110 is operated to inform the microprocessor 100 of the format of the video signals being analyzed.

As shown in FIG. 2, the microprocessor 100 supplies control signals to a window generator 118 and a bar display generator 120. The window generator 118 also receives horizontal drive signals and vertical drive signals from the color decoder 80. The window generator 118 is used to produce the window signals that control the size and position of the area of the video picture in which the quad integrator unit 82 samples the detail, Y, R-Y, and B-Y signals. The window generator 118 also produces window outline signals for display on a monitor. The bar display generator 120 produces bar formation signals for display on a monitor. As noted previously during the description of FIG. 1, this monitor may be the main monitor 50 or the supplemental monitor 62.

The window generator 118 may be identical to the window generator 310 illustrated in FIG. 9 of U.S. Pat. No. 4,694,329. The window generator 118 may comprise four programmable counters, each of which receives its count signal from the microprocessor 100. Such an arrangement is illustrated in FIG. 5 of U.S. Pat. No. 4,679,067 and U.S. Pat. No. 4,694,329. The four programmable counters determine the horizontal width and the vertical height of the window. The window outline signals may be formed by one-shot circuits which produce pulse signals when the programmable counters change state.

The bar display generator 120 may include programmable counters, too. The microprocessor 100 delivers signals representing the magnitude of the threshold level, or sensitivity setting, and the difference between successive field samples in various channels to the programmable counters. The programmable counters then operate to generate output pulse signals, where the width of each output pulse corresponds to the magnitude of the associated parameter.

The bar formation signals and the window outline signals are supplied to an amplifier 122 together with composite video signals from the input of the module 60. The amplifier 122 combines the composite video signals and the display signals and delivers its output signal to a monitor 124, e.g., the main monitor 50 or the supplemental monitor 62 of FIG. 1. The operator, therefore, may observe the video picture along with the bar graph display 70 and the window W3 on the monitor 124. The window W3 corresponds to the area of the video picture in which the quad integrator unit 82 samples the detail, Y, R-Y, and B-Y signals. As explained above, the size and position of the window W3 may be selectively changed by the operator. The bar graph display 70 is illustrated in greater detail in FIGS. 3A and 3B.

Figure 3B:
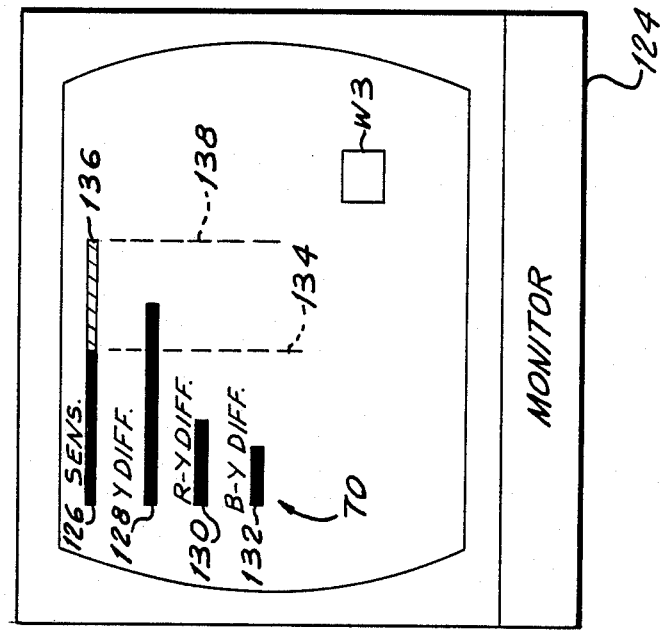
FIGS. 3A and 3B are enlarged views of the monitor shown in FIG. 2 and illustrate one type of display that may be employed with a scene acquisition and sensing module according to the invention.
Figure 3A:
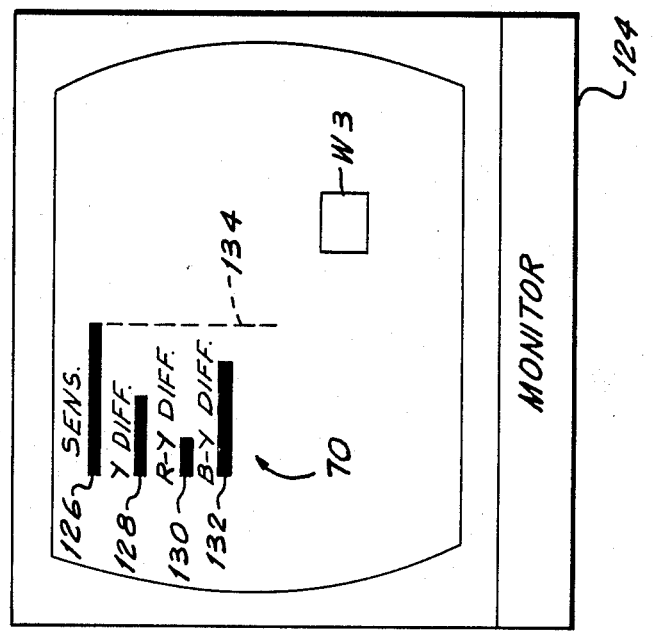

Referring now to FIG. 3A, the bar graph display 70 on the monitor 124 is formed from four bars 126, 128, 130, and 132. The bar 126 denotes the current threshold level for the scene acquisition and sensing module 60. A shorter sensitivity bar 126 denotes a lower threshold level, while a longer sensitivity bar 126 denotes a higher threshold level.

The bars 128, 130, and 132 indicate the frame-by-frame or field-by-field difference in the Y, R-Y, and B-Y signals, respectively. While display bars for the Y, R-Y, and B-Y signals are illustrated, the module 60 may generate display bars for additional or alternative signals. For instance, a bar designating the frame-by-frame or field-by-field difference in the detail signal may be displayed, as may a bar indicative of the frame-by-frame or field-by-field difference in the absolute value of the [(R−Y)−(B−Y)] signal.

FIG. 3A depicts a typical display when no new scene has been detected. Each of the bars 128, 130, and 132 is shorter than the sensitivity bar 126, which means that none of the Y, R-Y, and B-Y signals has changed sufficiently to exceed the threshold level. A dashed line 134 is drawn in FIG. 3A so that the length of the sensitivity bar 126 may be easily compared to the lengths of the bars 128, 130, and 132. FIG. 3B, on the other hand, shows a typical display when a new scene has been detected. Specifically, the Y difference bar 128 extends beyond the sensitivity bar 126, which means that the Y signal has changed sufficiently to exceed the threshold level.

FIG. 3B illustrates the effect of an adjustment of the sensitivity potentiometer 98 (FIG. 2). In particular, the cross-hatched region 136 shows the response of the sensitivity bar 126 when the threshold level is increased. In other words, the tip of the sensitivity bar 126 changes from its original position, designated by the dashed line 134, to its subsequent position, designated by the dashed line 138, as the sensitivity potentiometer 98 is repositioned. If the threshold level had initially been set as denoted by the bar 136, the scene acquisition and sensing module 60 would not have produced a change detect signal upon analyzing the video signals forming the picture of FIG. 3B since each of the bars 128, 130, and 132 in FIG. 3B is shorter than the sensitivity bar 126, which, in this example, extends to the position marked by the dashed line 138.

Flowchart

Figure 4A:
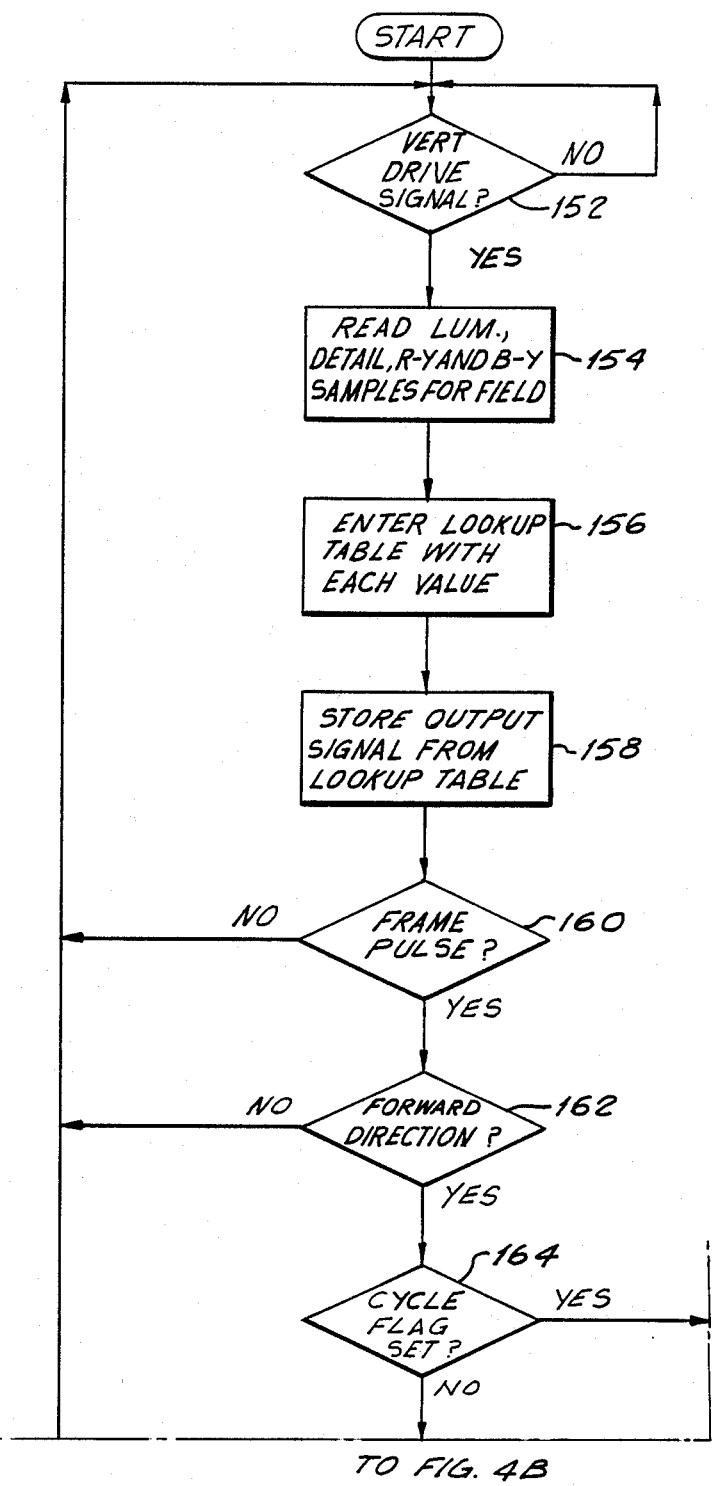
FIG. 4 is a flowchart of a routine that may be utilized to analyze video signals and sense the start of a new scene.
Figure 4B:
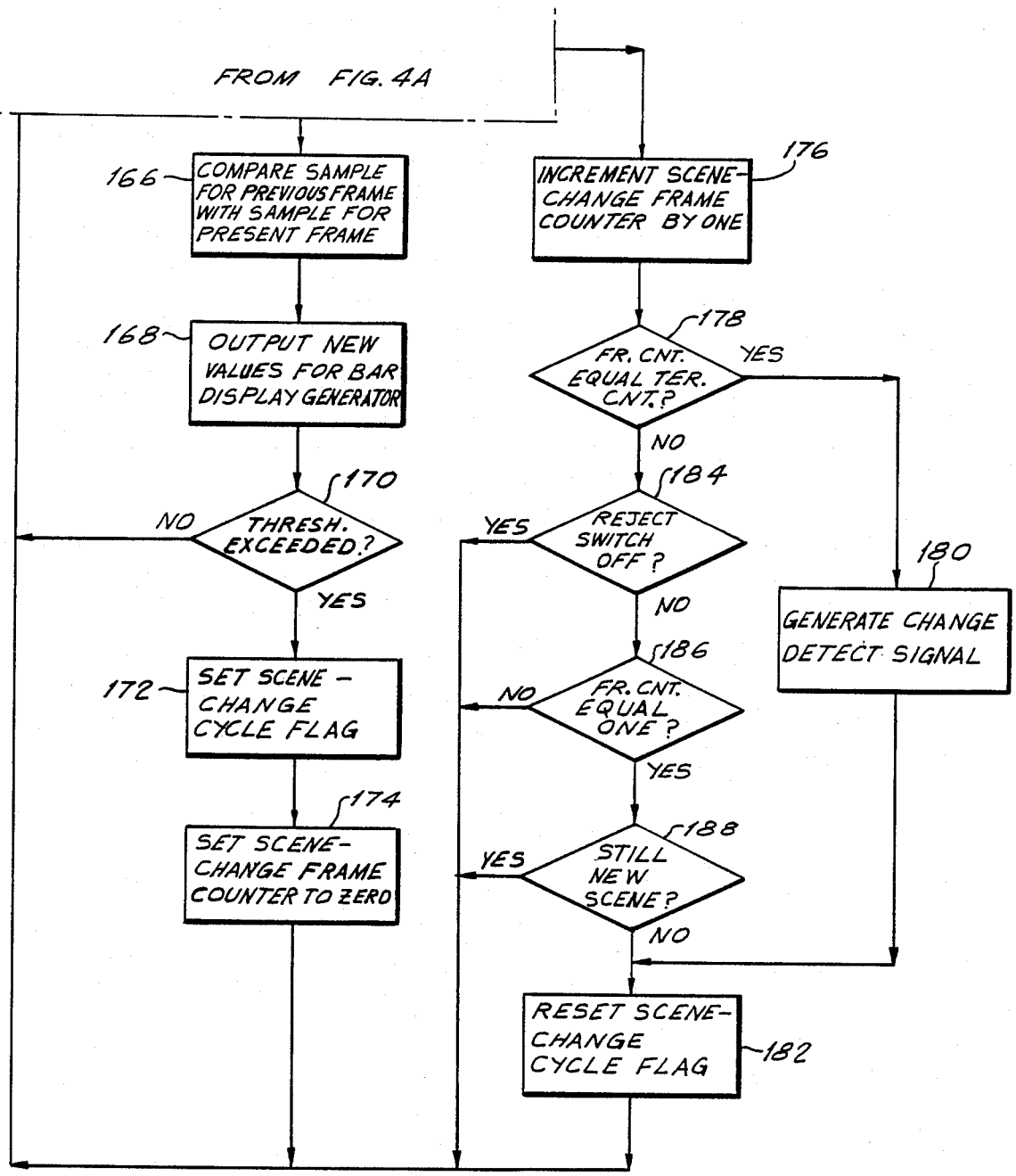

FIG. 4 illustrates a flowchart for a routine that may be programmed into the microprocessor 100 (FIG. 2). After starting, the routine inquires whether the next vertical drive signal has been received by the microprocessor, as indicated by 152. (The vertical drive signals occur between the end of one field and the beginning of the following field.) If not, the routine loops and continues to check until the microprocessor senses the next vertical drive signal. Upon detection of the next vertical drive signal, the routine causes the microprocessor to read the sampled values of each of the detail, Y, R-Y, and B-Y signals for the preceding field, as indicated by 154. These sampled values are supplied to the microprocessor by the bank of analog-to-digital converters 96 (FIG. 2).

Once these sampled values have been read, the routine enters an appropriate lookup table for each of the values, as designated by 156. For each value, the lookup table may be a linear table or a nonlinear or logarithmic lookup table. With a linear lookup table, the output value is a straight-line function of the input value. However, with a nonlinear or logarithmic lookup table, the output value is not a straight-line function of the input value.

A nonlinear or logarithmic lookup table is advantageously employed when the video signals have relatively low levels. For instance, a ten percent change in a video signal with a magnitude of two units may be as significant for scene change detection purposes as a ten percent change in a video signal with a magnitude of ten units. However, the actual change in the video signal of two units is substantially smaller than the actual change in the video signal of ten units, and the smaller change may not exceed the threshold level. Accordingly, the scene change would go undetected if the video signals being analyzed have such low levels.

In order to correct this problem and equate low-level and high-level video signals for purposes of scene change detection, a nonlinear or logarithmic lookup table may be provided. With such a table, smaller input values produce larger output values than with a linear lookup table. In other words, the table preferably has an output function which is higher than a straight-line function for low-level video signals. (Mathematically, the first derivative of the output function decreases as the input value increases.)

A single lookup table may be provided for all four of the detail, Y, R-Y, and B-Y signals. Alternatively, linear and nonlinear lookup tables may be available for the color-indicative (e.g., R-Y and B-Y) signals and other linear and nonlinear lookup tables may be available for the non-color-indicative (e.g., detail and Y) signals, or sets of linear and nonlinear lookup tables for each of the sampled signals may be provided. If both linear and nonlinear tables are stored in the memory for the microprocessor, the operator may control which type of table is used for each signal channel by suitably setting the DIP switches 114 and 116 (FIG. 2) and by selectively operating the "A/B mode" toggle switch 106 (FIG. 2).

Following the table lookup step, which is denoted by 156, the routine stores the output signals from the lookup table or tables, as designated at 158. Next, the routine ascertains whether a frame pulse has been received, as shown at 160. If not, the routine returns to the start and waits for the next vertical drive signal.

When the routine detects a frame pulse, which signifies a new image and a potential new scene, the routine then determines whether the image recording medium is moving in the forward direction, as illustrated at 162. If the image recording medium is not travelling in the forward direction, i.e., if it is moving in reverse, then, typically, the operator is not checking for the start of a new scene. Accordingly, the routine returns to the start and waits for the next vertical drive signal.

If the image recording medium is moving in the forward direction, the routine inquires whether the scene-change cycle flag has been set, as depicted at 164. The scene-change cycle flag is set when the routine detects a greater-than-threshold-level difference in one of the detail, Y, R-Y, and B-Y channels, as discussed below.

Assuming that the scene-change cycle flag has not been set and that the routine has not yet sensed a possible scene change, the routine compares a sample for the next-to-last frame with a sample for the last frame for each of the detail, Y, R-Y, and B-Y channels, as indicated by 166. As explained above, the signals in the detail, Y, R-Y, and B-Y channels are processed independently of one another to improve the ability of the equipment to sense new scenes. For each channel being displayed on the monitor 124 (FIGS. 2, 3A and 3B), the routine sends an appropriate value corresponding to difference between the next-to-last sample and the last sample to the bar display generator 120 (FIG. 2), as illustrated at 168. As explained above, these values are employed to produce the various bars in the bar graph display 70 (FIGS. 1, 2, 3A, and 3B).

Following the comparison and output steps denoted by 166 and 168, respectively, the routine determines if the difference between the next-to-last sample and the last sample in each of the detail, Y, R-Y, and B-Y channels exceeds the threshold level, as shown at 170. If no signal has changed sufficiently to exceed the threshold level, the routine considers the last frame to be part of the present scene. However, if one or more of the channels produces a greater-than-threshold-level difference, the routine will test to ascertain whether this is a true scene change or whether this is a spurious signal. To accomplish this test, the routine sets the scene-change cycle flag, as designated by 172, and then sets the scene-change frame counter to zero, as designated by 174. A set scene-change cycle flag signifies that a scene change may have occurred, but the routine will check subsequent difference signals to ensure that an actual scene change has taken place.

After the setting steps, depicted at 172 and 174, the routine returns to the start and sequentially performs the steps 152 through 164. Assuming that the scene-change cycle flag has been set because a greater-than-threshold-level difference has appeared in at least one channel, the result of the cycle flag inquiry, indicated by 164, is a "yes." Consequently, the routine branches to the right in FIG. 4 and increments the scene-change frame counter by one, as denoted by 176. Next, the routine ascertains whether the count of the scene-change frame counter equals the terminal count, as illustrated at 178. If this count equals the terminal count, the routine generates a change detect signal, as shown at 180, and then resets the scene-change cycle flag, as shown at 182. The scene-change cycle flag is reset in preparation for another scene detect cycle.

Typically, the terminal count of the scene-change frame counter will be four or five counts. The color corrector 11 is programmed to expect a predetermined delay between the start of a new scene and the generation of a change detect signal, as explained in U.S. Pat. No. 4,694,329. The terminal count of the frame counter is selected to correspond to this predetermined delay.

Referring again to the scene-change frame counter inquiry, indicated by 178, if the count of the scene-change frame counter is less than the terminal count, the routine checks the position of the "reject on/off" toggle switch 108 (FIG. 2), as denoted by 184.

If the reject switch 108 is in the "off" position, a single greater-than-threshold-level difference in one of the detail, Y, R-Y, and B-Y channels will cause a change detect signal. That is, the routine does not test samples from subsequent frames to ensure that an actual scene change has taken place. An isolated greater-than-threshold-level difference will not be rejected by the microprocessor and will, therefore, result in a change detect signal. By contrast, if the reject switch 108 is in the "on" position, the routine tests samples from a subsequent frame to make sure that a true scene change has occurred.

Assume that the reject switch 108 is in the "off" position and that a greater-than-threshold-level difference has appeared in at least one channel. As a result of the reject switch inquiry, denoted by 184, the routine branches to the left in FIG. 4 and returns to the start. The routine then loops through the steps 152, 154, 156, 158, 160, 162, 164, 176, 178, and 184 until the count of the scene-change frame counter equals the terminal count. When this occurs, the routine generates a change detect signal, as illustrated at 180, and then resets the scene-change cycle flag, as illustrated at 182, to begin another detection cycle.

Assume next that the reject switch 108 is in the "on" position and that a greater-than-threshold-level difference has appeared in at least one channel. The routine will now make sure that a true scene change has occurred. As a result of the reject switch inquiry, designated by 184, the routine will branch down in FIG. 4 and check whether the count of the scene-change frame counter equals one, as illustrated at 186. A count of one signifies that only one greater-than-threshold-level difference has previously appeared, and such a difference may be caused by noise.

If the count of the scene-change frame counter equals one, the routine determines whether a new scene is still being sensed, as shown at 188. Specifically, the routine compares the sample for the last frame with the sample for the frame immediately prior to the first greater-than-threshold-level difference signal, and inquires whether the difference between these samples exceeds the threshold level. If so, the routine is confident that the old scene has ended and that a new scene has started since two consecutive difference signals exceed the threshold level.

Referring to the test performed at 188, if a new scene is still being sensed, the routine then loops through the steps 152, 154, 156, 158, 160, 162, 176, 178, 184 and 186 until the count of the scene-change frame counter equals the terminal count. When this occurs, the routine generates a change detect signal, as depicted at 180, and then resets the scene-change cycle flag, as denoted by 182, to begin another detection cycle. However, if a new scene is not still being sensed, the routine considers the isolated greater-than-threshold-level difference to be the result of noise and simply resets the scene-change cycle flag, as shown at 182.

FIG. 4 illustrates a flowchart for a routine that may be utilized to analyze various video picture signals to detect a scene change. However, other routines may be used to carry out the invention. Different standards may be employed when checking for the start of a new scene. For instance, another standard may be used to sense a dissolve, and samples for a plurality of frames or fields may be compared with one another and/or a threshold level.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

We Claim:

1. A system for color correcting video picture signals representative of images stored by an image recording medium, comprising:

transport means for moving the image recording medium and supplying video picture signals representative of each of the images stored by the image recording medium, said video picture signals being capable of producing pictures corresponding to the images;

discrimination means for discriminating video picture signals forming one area of the picture from video picture signals forming the remainder of the picture, said one area being smaller than the entire area of the picture;

scene change detecting means for processing said video picture signals and detecting a change of scene in said pictures, said detecting means including means for analyzing a change in each of at least two different parameters of said video picture signals in relation to a predetermined standard, said detecting means being connected to said discrimination means and analyzing only video picture signals in said one area, said detecting means including means for generating a change detect signal when the change in at least one of said parameters satisfies said predetermined standard; and color correction means for developing color correction signals for the video picture signals forming the pictures in various scenes.

2. A system as recited in claim 1, wherein one of said two different parameters corresponds to a signal indicative of the color content of the picture and wherein said analyzing means includes means for analyzing the change in said color indicative signal.

3. A system as recited in claim 1, wherein one of said two different parameters corresponds to signals in a preselected frequency range, said preselected frequency range being below the range of frequencies for chrominance signals, and wherein said analyzing means includes means for analyzing the change in said signals in said preselected frequency range.

4. A system as recited in claim 3, wherein said preselected frequency range is between about 1.5 megahertz and about 2.5 megahertz.

5. A system as recited in claim 1, further comprising:

means for generating signals indicative of said predetermined standard and for generating signals indicative of the change in each of said two parameters; and display means for displaying the pictures formed by the video picture signals along with the signals indicative of said predetermined standard and the signals indicative of the change in each of said two parameters.

6. A method for color correcting video picture signals representative of images stored by an image recording medium, comprising the steps of:

moving the image recording medium and supplying video picture signals representative of each of the images stored by the image recording medium, said video picture signals being capable of producing pictures corresponding to the images;

discriminating video picture signals forming one area of the picture from video picture signals forming the remainder of the picture, said one area being smaller than the entire area of the picture;

detecting a change of scene in said pictures by analyzing only video picture signals in said one area, said detecting step including the step of analyzing a change in each of at least two different parameters of said video picture signals in relation to a predetermined standard;

generating a change detect signal when the change in at least one of said parameters satisfies said predetermined standard; and developing color correction signals for the video picture signals forming the pictures in various scenes.

7. A method as recited in claim 6, wherein one of said two different parameters corresponds to a signal indicative of the color content of the picture and wherein said detecting step includes analyzing the change in said color indicative signal.

8. A method as recited in claim 6, wherein one of said two different parameters corresponds to signals in a preselected frequency range, said preselected frequency range being below the range of frequencies for chrominance signals, and wherein said detecting step includes analyzing the change in said signals in said preselected frequency range.

9. A method as recited in claim 8, wherein said preselected frequency range is between about 1.5 megahertz and about 2.5 megahertz.

10. A method as recited in claim 6, further comprising the steps of:

generating signals indicative of said predetermined standard;

generating signals indicative of the change in each of said two parameters; and displaying the pictures formed by the video picture signals together with the signals indicative of said predetermined standard and the signals indicative of the change in each of said two parameters.

11. A color correction system for color correcting video picture signals representative of images stored by an image recording medium, comprising:

means for moving the image recording medium and producing video picture signals representative of each of the images stored by the image recording medium;

display means responsive to said video picture signals for displaying pictures corresponding to each of the images stored by the image recording medium;

scene analysis means for analyzing at least one of the video picture signals in each of a plurality of pictures to detect a scene change, said scene analysis means automatically producing a scene-change signal in response to a scene change, said scene analysis means including means for determining a first average level of selected video signals within a predetermined range of frequencies in a portion of a first field, means for determining a second average level of said selected video signals in said portion of a second field, means for evaluating the difference between the first and second average levels based upon a predetermined standard, and means for automatically producing said scene-change signal if the predetermined standard is satisfied;

color correction means for selectively producing color correction signals for said video picture signals;

first storage means for selectively storing said color correction signals in response to a first manual command;

position signal means for producing position signals indicative of the position of each of the images stored by the image recording medium;

means for determining the location of an initial image of a new scene from the scene-change signal and from the position signals, said location determining means producing a location signal representative of the location of the initial image of the new scene;

second storage means for selectively storing said signal representative of the location of the initial image of the new scene in response to a second manual command;

readout means for reading from said first and second storage means said color correction signals and said location signals, respectively; and combining means for selectively combining color correction signals read from said first storage means with said video picture signals, said combining means being responsive to the location signals read from said second storage means and to the position signals from said position signal means.

12. A system as recited in claim 11, wherein said predetermined range of frequencies is below the range of frequencies for chrominance signals.

13. A system as recited in claim 12, wherein said predetermined range of frequencies corresponds to the detail lines of a monochrome video picture.

14. A system as recited in claim 11, further comprising means for selectively ignoring said scene-change signal.

15. A method for color correcting video picture signals representative of images stored by an image recording medium, comprising the steps of:

moving the image recording medium;

producing video picture signals representative of each of the images stored by the image recording medium;

displaying pictures corresponding to each of the images stored by the image recording medium;

analyzing at least one of the video picture signals in each of a plurality of pictures to detect a scene change, said analyzing step including the steps of determining a first average level of selected video signals within a predetermined range of frequencies in a portion of a first field, determining a second average level of said selected video signals in said portion of a second field, and evaluating the difference between the first and second average levels based upon a predetermined standard;

automatically producing a scene-change signal if the predetermined standard is satisfied;

selectively producing color correction signals for at least one of said video picture signals;

selectively storing said color correction signals in response to a first manual command;

producing position signals indicative of the position of each of the images stored by the image recording medium;

determining the location of an initial image of a new scene from said scene-change signal and from said position signals;

producing a location signal representative of the location of the initial image of the new scene;

selectively storing said location signal in response to a second manual command;

reading said color correction signals and said location signals; and selectively combining said color correction signals with said video picture signals in response to said location signals and said position signals.

16. A method as recited in claim 15, wherein said predetermined range of frequencies is below the range of frequencies for chrominance signals.

17. A method as recited in claim 16, wherein said predetermined range of frequencies corresponds to the detail of an image in a video picture.

18. An apparatus for electrically analyzing video signals which form a plurality of video pictures to detect a scene change, said apparatus comprising:

bandpass filter means for transmitting video signals within a preselected pass band;

scene sensing means responsive to the video signals transmitted by said bandpass filter means, said scene sensing means including means for determining a first average level of said transmitted video signals in at least a portion of a second field, means for comparing the difference between the first and second average levels to a predetermined standard, and means for producing an output signal indicative of a scene change if the predetermined standard is satisfied.

19. An apparatus as recited in claim 18, wherein said preselected pass band is centered at approximately 2.0 megahertz and has a width of about 1.0 megahertz around the center frequency.

20. A method for electrically analyzing video signals which form a plurality of video pictures to detect a scene change, said method comprising the steps of:

transmitting video signals within a preselected pass band;

sensing a scene change by analyzing said transmitted video signals, said sensing step including the steps of determining a first average level of said transmitted video signals in at least a portion of a first field, determining a second average level of said transmitted video signals in at least a portion of a second field, comparing the difference between the first and second average levels to a predetermined standard; and producing an output signal indicative of a scene change if the predetermined standard is satisfied.

* * * * *